United States Patent

[11] 3,597,775

| [72] | Inventor | Thomas A. McCasland<br>Mountain View, Calif. |
|---|---|---|
| [21] | Appl. No. | 769,242 |
| [22] | Filed | Oct. 21, 1968 |
| [45] | Patented | Aug. 10, 1971 |
| [73] | Assignee | Diversified Electronics Co., Inc.<br>Sunnyvale, Calif. |

[54] PRODUCT-FORMING TOOL
1 Claim, 5 Drawing Figs.

[52] U.S. Cl. .................................. 7/5.3, 7/5.6,
72/409, 81/5.1, 81/426
[51] Int. Cl. ............................................. B25b 7/22
[50] Field of Search .......................................... 7/5.1—5.6;
43/44.89; 72/409; 81/5.1, 352, 353, 373, 426

[56] References Cited
UNITED STATES PATENTS

| 287,159 | 10/1883 | Poole | 7/5.1 |
| 304,089 | 8/1884 | Entrekin | 7/5.6 |
| 488,785 | 12/1892 | Bernard | 7/5.6 |
| 2,571,819 | 10/1951 | Boel et al. | 81/426 |
| 2,618,994 | 11/1952 | Frazee | 7/5.4 X |
| 2,753,741 | 7/1956 | Riley | 7/5.6 X |

FOREIGN PATENTS

| 828,791 | 2/1938 | France | 7/5.2 |

*Primary Examiner*—Theron E. Condon
*Assistant Examiner*—Robert L. Spruill
*Attorney*—Townsend and Townsend ABSTRACT: A handtool adapted for forming a product including cutting the same and providing a recess therein. The invention is especially adapted for making a sinker for attachment to a fishing line wherein a length of sinker material is cut to a desired size and provided with a recess therein for receiving the fishing line. The recess can be either a hole or a groove in the sinker.

Patented Aug. 10, 1971
3,597,775
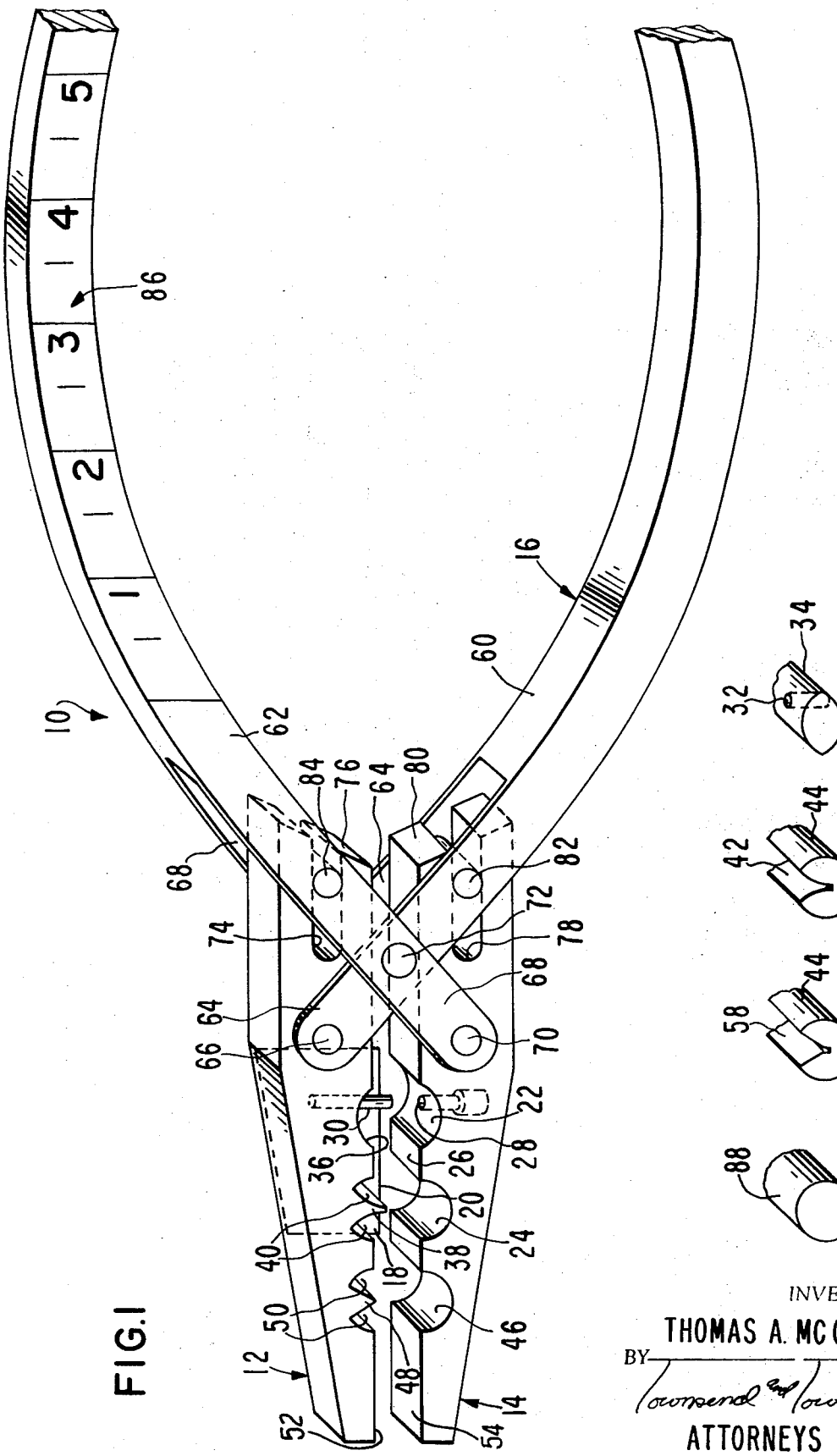
INVENTOR.
THOMAS A. MCCASLAND
BY
Townsend and Townsend
ATTORNEYS

PRODUCT-FORMING TOOL

This invention relates to improvements in handtools and, more particularly, to a handtool for forming a particular type of product, such as a sinker for use with a fishing line.

While the present invention may be adapted for a number of different uses, it is especially adapted for and will be described hereinafter with respect to the making of a sinker for use as a weight for a fishing line. Specifically, the structure of the invention includes a pair of relatively shiftable jaws and handle means connected to the jaws for moving the same toward and away from each other. Cutter means is provided on the jaws to cut a length of material to the desired size and, in the case of a sinker, this size will correspond to a predetermined weight. Forming means on the jaws causes the formation of a recess in the material as it is cut to size. The recess is for receiving a fishing line and can, for instance, be a hole through the sinker or can be a closeable groove. If the recess is a groove, the jaws have means for closing the groove with the line therein to thereby attach the line to the sinker and additional means is provided to open the groove to permit separation of the line from the sinker, such as after the sinker has been used.

The tool of this invention permits a fisherman to make sinkers at the point of use and avoid having to buy a number of sinkers of different weights which must be stored in a tackle box or the like until ready for use. With the present invention, a fisherman can obtain a relatively long length of sinker material and cut it to size as sinkers are needed. Not only can the material be cut by the handtool, but it can also be provided with the line-receiving recess therein so that a sinker of the desired length can immediately be ready for attachment to a fishing line following a single manual step of manipulating the jaws so that they move toward each other.

The handle of the tool may have a scale along its length with the scale calibrated in weight units. Thus, the handtool is self-contained and no other structure is needed with the tool to form a sinker having a particular weight.

The primary object of this invention is to provide a handtool for forming a product from a length of material wherein the material is not only cut to a desired size but is provided with a recess therein whereby the handtool is adapted to be used in forming sinkers for use as weights to be attached to fishing lines.

Another object of this invention is to provide a sinker-making tool wherein the tool has a pair of jaws provided with cutter means and recess-forming means thereon whereby a length of sinker material can be cut to size and provided with a line-receiving recess by a simple manual manipulation of the handtool to cause the jaws to move relative to each other.

Still a further object of this invention is to provide a sinker-making tool of the type described wherein the cutting and forming of a length of sinker material is done simultaneously so that the formed sinker is immediately ready for attachment to a fishing line without further operations thereon.

Other objects of this invention will become apparent as the following specification progresses, reference being had to the accompanying drawing for an illustration of the invention:

In the drawings

FIG. 1 is a perspective view of the handtool of the invention; and

FIGS. 2—5 are fragmentary, perspective views of several sinkers showing the way they appear before and after they have been subjected to the tool.

The handtool of this invention is denoted by the numeral 10 and includes a pair of relatively shiftable jaws 12 and 14 connected to handle means 16 for movement toward and away from each other. The way in which the handle means interconnects the jaws permits the latter to remain essentially parallel at all times as they move toward and away from each other. Thus, the jaws do not rotate such as due to the jaws of, for instance, a pair of pliers.

Jaw 12 has a blade 18 mounted on one side thereof, the blade having an edge 20 for cutting a length of sinker material when the jaws are moved toward each other. The length of edge 20 is sufficient to permit the blade to move past the ends of a pair of concave portions 22 and 24 formed in the inner end face 26 of jaw 14. Portions 22 and 24 are provided to support a length of sinker material during the sinker-forming operation.

Jaw 14 also has a die 28 extending from portion 22 in a direction away from jaw 12. Die 28 can be of any construction, such as a hole drilled in jaw 14. The die is aligned with a pin 30 secured to and extending outwardly from the inner end face of jaw 12. The pin is received within die 28 as the jaws move toward each other. Thus, a length of sinker material supported in portion 22 will be effectively drilled with a hole such as hole 32 of sinker 34 (FIG. 5). The pin 30 extends outwardly from a concave portion 36 in jaw 12, portion 36 being in alignment with portion 22.

Jaw 12 also has a wedge-shaped, groove-forming member 38 aligned with portion 24 and a pair of recesses 40 on opposite sides of member 38. When the jaws are brought together, member 38 forms a groove 42 in a sinker 44 (FIG. 4).

A third concave portion 46 is formed in jaw 14 adjacent to portion 24 and is in alignment with another wedge-shaped opening member 48 formed in the opposite end face of jaw 12. A pair of recesses 50 are formed in jaw 12 on opposite sides of member 48.

Member 48 is used to open a sinker previously formed by member 38 and closed by a pair of flat, end face portions 52 and 54 adjacent to the outer extremities of jaws 12 and 14, respectively. FIG. 3 illustrates a sinker 44 which is opened by member 48 to present a groove 58. This groove allows the removal of a line from sinker 44.

Handle means 16 includes a pair of handles 60 and 62 pivotally coupled to the jaws and to each other for moving the jaws into and out of sinker-forming relationship. Each handle is bifurcated to present a pair of spaced, generally parallel sides. Spaced sides 64 of handle 60 receive the jaws therebetween in the manner shown in FIG. 1 and are pivotally coupled to jaw 12 by a pivot pin 66 which extends through jaw 12. Similarly, the sides 68 of handle 62 are pivotally coupled by a pivot pin 70 to jaw 14. Each side 64 is pivotally connected by a rivet or the like 72 to the adjacent side 68. Jaw 12 has a slot 74 extending inwardly from an end face 76 thereof. Similarly, jaw 14 has a slot 78 extending inwardly from an end face 80 thereof. A pin 82 interconnects sides 64 of handle 60 and is shiftably received within slot 78 of jaw 14. Similarly, a pin 84 interconnects sides 68 and is shiftably received within slot 74. The slots are in alignment with pins 66 and 70 respectively; thus, pin 82 is in alignment with pin 70 and pin 84 is in alignment with pin 66 at all times. This construction, therefore, causes the jaws to remain substantially parallel with each other as they move toward and away from each other.

A suitable spring (not shown) can be used to bias jaws 12 and 14 apart. Thus, manual force exerted on handles 60 and 62 will close the jaws and the jaws will then open when the manual force is removed.

Handle 62 has a scale 86 along the length thereof. This scale is preferably calibrated in units of sinker weight for a given sinker material, such as lead or the like.

In use, a length of sinker material, such as lead, is first measured along handle 62 to obtain the desired length for the given weight on scale 86. The sinker material may, for instance, have the cylindrical shape of the element 88 of FIG. 2. Assuming that the length has been determined, the tool is, for purposes of illustration, held in the left hand while element 88 is held in the right hand and positioned so that edge 20 is aligned with the area at which the cut is to be made. If the sinker is to be of the type shown in FIG. 5, the element will be supported in portion 22. Thus, when the handles are moved together, blade 18 cuts the element to the proper length and pin 30 forms hole 32. Thus, sinker 34 is formed and is immediately ready for attachment to a fishing line. The line is fed through hole 32 and then tied to retain the sinker on the line.

If the sinker is to be of the type shown in FIG. 4, a groove 42 is formed as the sinker is cut. To this end, the element 88 is supported in portion 24 and member 38 forms groove 42 when the jaws are moved together. The line is then placed in groove 42 and the sinker is positioned between end faces 52 and 54, whereupon the jaws are then moved together again to deform sinker 44 so as to close the groove with the line therein. The line is then held secure to the sinker.

After using sinker 34, it can be separated from the line, such as by cutting the line. To separate the line from sinker 44, tool 10 is used once again. The sinker is placed in portion 46 and member 48 is forced into the sinker where the groove was initially formed to thereby pry the sides forming groove 42 apart to thereby define groove 58. The line can then be removed from the sinker and the sinker stored for future use.

The present invention provides a handtool for making sinkers which is easy to operate and requires no special skills to use. It can be stored in a minimum amount of space and, when operated, simultaneously cuts a sinker to the proper length while forming a recess, such as a hole or a groove, in the sinker to permit a fishing line to be immediately coupled to the sinker. By buying sinker material in relatively long lengths and by using tool 10, sinkers can more economically be provided then is presently capable with the use of conventional sinkers since the latter require a relatively large assortment to meet specific needs.

I claim:
1. A handtool for making a sinker having a recess therein for receiving a fishing line comprising: a pair of jaws; a handle for each jaw, respectively; means pivotally connecting the handles to respective jaws and to each other for mounting the jaws for substantially rectilinear movement toward and away from each other with the jaws being substantially parallel with each other, each jaw having an inner face, the inner face of one of the jaws having a pair of spaced, concave portions, each of said concave portions being adapted for supporting a length of sinker material, the other jaw having a cutter movable past one end of each of said concave portions to sever a length of sinker material supported therein when the jaws move toward each other; a pin on the inner face of said other jaw in alignment with one concave portion, the latter having a die for receiving the pin to thereby cause a hole to be formed through the sinker material supported in said one concave portion as the jaws move together and as the sinker material is cut by said cutter, the other jaw having a wedge-shaped, groove-forming member in alignment with the other of said concave portions, each jaw having a flat end face portion on the inner face thereof, the end face portions of the jaws being in alignment with each other for closing the groove formed in the sinker material by said member.